(12) United States Patent
Merz

(10) Patent No.: US 8,208,871 B2
(45) Date of Patent: Jun. 26, 2012

(54) HAND HELD, ERGONOMIC GRIP HAVING A PORTABLE TELEPHONE DEVICE REMOVABLY COUPLED THERETO

(76) Inventor: Michael Merz, Boca Raton, FL (US)

( * ) Notice: Subject to any disclaimer, the term of this patent is extended or adjusted under 35 U.S.C. 154(b) by 650 days.

(21) Appl. No.: 12/379,201

(22) Filed: Feb. 13, 2009

(65) Prior Publication Data
US 2010/0210329 A1 Aug. 19, 2010

(51) Int. Cl.
H04B 1/38 (2006.01)
(52) U.S. Cl. ................................. 455/90.3
(58) Field of Classification Search ............ 455/90.3
See application file for complete search history.

(56) References Cited

U.S. PATENT DOCUMENTS

| | | |
|---|---|---|
| D379,819 S | 6/1997 | Kelley et al. |
| D413,607 S | 9/1999 | Lindahl |
| D425,908 S | 5/2000 | Collins |
| D428,002 S | 7/2000 | Lindahl |
| D432,530 S | 10/2000 | Lindahl |
| 6,427,959 B1 | 8/2002 | Kalis et al. |
| D462,677 S | 9/2002 | Eroma |
| D469,427 S | 1/2003 | Ma et al. |
| D481,033 S | 10/2003 | Pelker |
| 6,754,343 B2 | 6/2004 | Lundstrom et al. |
| D494,963 S | 8/2004 | Schwimmer et al. |
| 6,837,435 B2 | 1/2005 | Kehoe et al. |
| D532,004 S | 11/2006 | Kettula |
| 7,147,163 B2 * | 12/2006 | Salvato et al. ........... 235/472.02 |
| D535,988 S | 1/2007 | Kettula |
| 2004/0204166 A1 | 10/2004 | Bae |
| 2007/0045495 A1 | 3/2007 | Asano |

FOREIGN PATENT DOCUMENTS

| | | |
|---|---|---|
| EP | 99306537.4 | 2/2000 |
| JP | 288593 | 1/2007 |

OTHER PUBLICATIONS

Unknown, Bury Comfort Cradle/Hang Up Cup/Apple IPhone, www.cellphonemall.net.
Unknown, Softalk II Shoulder Rest, Softalk Communications, http://www.softalk.us/products/softtalk2.htm

* cited by examiner

*Primary Examiner* — Lincoln Donovan
*Assistant Examiner* — Daniel Rojas
(74) *Attorney, Agent, or Firm* — Tangent Law Group, PLLC; Eric J. Weierstall, esq.

(57) ABSTRACT

A an apparatus and method for providing a hand held, ergonomic grip removably retaining a portable phone device and sized and shaped to accommodate the distance from the ear to the mouth on a human head. The grip having an ergonomic grip body held in a hand and sized and shaped to accommodate the distance between said ear and said mouth when held in an operating position. An opening within the ergonomic grip body removably retaining the portable phone device therein. An at least one operating control element thereon. An at least one portion of the ergonomic grip body facilitating release of the portable phone device from the ergonomic grip body and an at least one grip element on the ergonomic grip, wherein a user holds the grip element and thereby the grip body the removable retains the portable phone device in the operating position and the ergonomic grip body fits the ergonomic distance from ear to mouth.

14 Claims, 6 Drawing Sheets

HAND HELD, ERGONOMIC GRIP HAVING A PORTABLE TELEPHONE DEVICE REMOVABLY COUPLED THERETO

BACKGROUND OF THE INVENTION

1. Field of the Invention

The invention relates to a hand held grip to provide more ergonomically accommodating use of portable phone devices and the like.

2. Background of the Invention

Portable telephones or hand-held computers with telephone functions and the similar wireless devices, hereinafter referred to as portable phone devices or potable wireless phone devices (PPDs), have come to be essential communications tools in everyday life. Increasingly, people are utilizing these portable wireless phone devices far more often than the older, terrestrial counterpart. In fact a greater and greater number of phone users are forgoing the traditional home land or terrestrial line for their homes for any number of reasons and instead using the portable phone devices as a primary telephone. These users have come to rely exclusively on their portable phone devices for their personal telephonic communication needs.

One of the advantages to the portable phone device its portability. These units are designed to fit in the hand or palm of the user and then typically fold to an even smaller footprint for storage and transport. The device itself can become difficult for a typical user to grasp especially for long periods of time. The competing design requirements for small portable footprints for the portable phone devices are counter to the ergonomic design requirements for comfortable use of home phones, like those of existing terrestrial handsets that are more easily held in the hand and to the head for long periods of time.

In addition to the ergonomic issues, the more modern portable phone devices often come bundled with additional functions and features. These features often include web browsers, calendaring, and electronic mail. In addition to wireless connections to update and operate these features, these devices can also typically be inserted into a "hot-sync" cradle, which is tethered to a desktop PC to connect to and update features like calendars and address books and the like. During the "sync" operation typically both databases get updated with any information that was added to either or one of the databases may be set to overwrite since the last synchronization procedure. This ability to coordinate this information is critical in reducing redundant data entry and possible errors in the information from such entry.

The phone typically also includes volatile memory storage devices, such as RAM. Information stored in the volatile memory may be lost if the power level of the battery of the portable phone device falls below a certain level. Currently, cradles and similar devices and power cables typically provide a hard wired power source to allow for recharging of the portable phone device. However, these cradles are generally not designed to overcome the ergonomic deficiencies of the portable phone devices as they are themselves not hand held devices, but either car operated or desk mounted retainers or chargers. Ideally, a grip having these functions when not in operation would provide a greater functionality to for the portable telephone device.

Furthermore, increasingly portable phone devices and the network providers are turning to local area wireless networks, like those provided by wi-fi internet access points or "hot spots" to provide updates for these features as well as optional telephone services through the internet. The telephone services being provided in such a manner having a reduced billing cost relative to air time on a cellular phone network. Additionally, downloadable "rich" media, such as videos, photos, and games and the like, have been more frequently utilized and accessed via a portable phone device. These can be accessed via a more cost effective network access rather than the cellular network. Access while the portable phone device is in use and while the portable phone device is not in use to a network like the internet and additional storage capacity to contain downloads to be uploaded to the phone would be beneficial in the management of downloads for the personal phone device. To date no cradle or grip or holder provides such access or the ability to move data in a way that would also incorporate improved ergonomic functioning of the portable phone device as a telephone.

In each instance, a need exists to provide better ergonomic utility to the portable telephone devices when they are being used in a non-traditional fashion—when they are not being carried as a wireless option but instead are being utilized in a more traditional fashion similar to terrestrially wired telephones that are part of the Plain Old Telephone Service (POTS). Such a device should incorporate the features to facilitate the function of additional applications that the portable telephone or phone device possesses. Additionally, it should embrace new and developing technologies for interfacing the portable phone device with alternative networks, like Bluetooth, Wi-Fi, and the like to reduce the costs of use of the portable phone devices and provide cost effective access to high bandwidth applications, like games, movies and the like.

Therefore, a need exists to provide an ergonomic, hand held grip that provides ease of use for portable telephone devices for extended periods of time. The ergonomic hand held grip should also provide additional functionality to the portable telephone device, such as but certainly not limited to recharging of the portable telephone device and/or "hot syncing" and similar functions. Additionally, the ergonomic hand held grip should also include optional hardware to allow the grip to act as an alternative network access point, such as a Wi-Fi network access point or "hot spot".

SUMMARY OF THE INVENTION

There exists a need to provide enhanced ergonomic functionality from a grip for a portable phone device to extend the comfort in using the device for extended periods of time and to further enhance the talk time of the device.

An object of the invention is to provide a grip that has enhanced ergonomic functionality with added electronic functionality and charging features for a portable phone device.

A further need exists for a detachable adapter having additional functionality for a hand-held portable phone device to extend the ability to use it as a primary telephone and make it easier to use in such a role.

A need exists to provide an adapter having additional electronic functionality for a hand held computer such as a personal phone device.

The invention includes a grip or adapter that adds functionality and ruggedness to a commercially designed portable phone device. In an exemplary embodiment the invention includes an ergonomic grip body that connects to portable phone device via the portable phone device's interface connector. The ergonomic grip enhances the mechanical ruggedness of the portable phone device and protects the portable phone device during drop and vibration. It adds to the functionality of the portable phone device by making the device more ergonomic when being held in the hand and then to the ear for use as a telephone. The adapter easily slides on the portable phone device and may incorporate a retainer clip to lock the adapter and the portable phone device together. Electronics in the adapter add wireless internet access, recharging and other support capabilities.

In another exemplary embodiment the invention includes an adapter unit having a gripping surface that enhances the ergonomics of the grip is provided and helps prevent the grip from slipping out of a user's hand while the grip more ergonomically fits between the ear and mouth of the human head.

The invention includes an apparatus, and a method for using the apparatus.

The apparatus of the invention includes a hand held, ergonomic grip removably retaining a portable phone device and sized and shaped to accommodate the distance from the ear to the mouth on a human head, the grip having an ergonomic grip body hand held and sized and shaped to accommodate the distance between said ear and said mouth when held in an operating position. An opening within the ergonomic grip body removably retaining the portable phone device therein is provided along with an at least one operating control element. An at least one portion of the ergonomic grip body facilitates release of the portable phone device from the ergonomic grip body. An at least one grip element is provided on the ergonomic grip, wherein a user holds the grip element and thereby the portable phone device in the operating position and the ergonomic grip body fits the ergonomic distance from ear to mouth.

The exemplary embodiment of the invention can also include an at least one retaining element that retains the portable phone device in the opening in the grip. The retaining element that retains the portable phone device in the opening in the grip can retain it through a friction fit with said at least one retaining element. The ergonomic grip can further comprise an additional power supply for said portable phone device contained within the ergonomic grip body. The additional power supply can further include at least one additional battery that provides additional power to the portable phone device.

The additional power supply can also further comprises an at least one power cord connector, where said power cord connector is coupled to said portable phone device and provides power from a power supply to operate, recharge, or operate and recharge the portable phone device.

The ergonomic grip body can be curved. The ergonomic grip body can have an at least one flat portion permitting the grip to rest on a flat surface when not in an operating position. An electrical interface may also be provided. The electrical interface can couple the grip and the portable device via wire or wirelessly to an external computer or network access point that permits one or two way communication with the portable phone device.

The method of the invention includes a method of using a hand held, ergonomic grip, removably retaining a portable phone device, the method comprising the steps of inserting the portable phone device into an at least one recess in the hand held, ergonomic grip such that it is removably retained and coupled with an electrical interface; operating said phone within said hand held ergonomic grip; and holding said hand held grip in a hand of the user and to an ear of the user such that the hand held grip is held by the hand of the user and extends substantially between said hand and said ear while allowing for the functioning of the portable phone device.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

Figure 1:
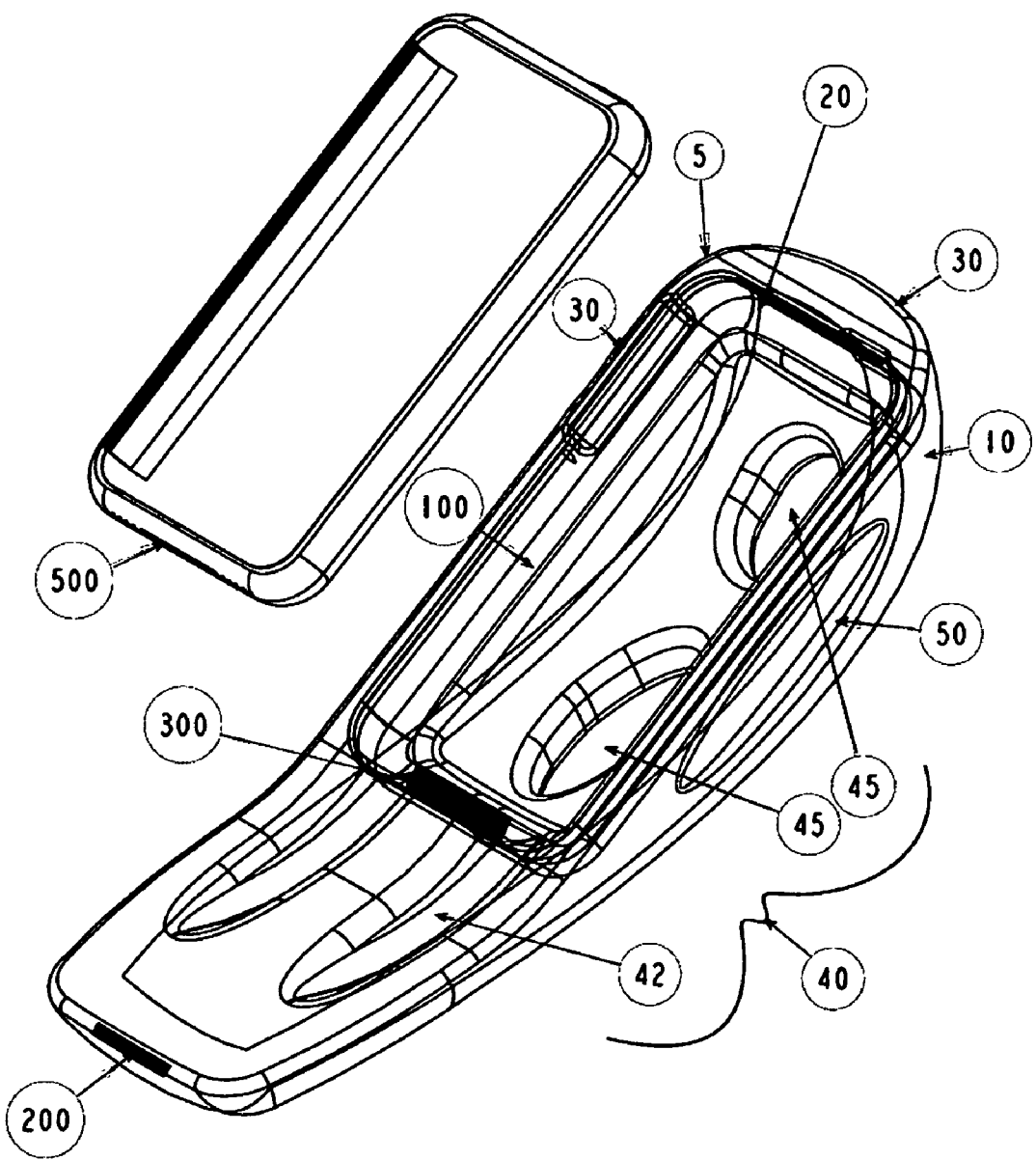
FIG. 1 illustrates an exploded view of an exemplary embodiment of the instant invention and a portable phone device.

The description of the invention is segmented into sections on definitions and a detailed description of an exemplary embodiment of the invention.

Definitions

In describing the invention, the following definitions are applicable throughout.

A "portable phone device" or "portable telephone device" refers to any apparatus that is portable and provides telephonic functions, such as but not limited to a cellular phone, smart phones, an IPHONE, a BLACKBERRY, a PDA, a hand held computer, and the like. These devices include a handheld device capable of receiving and processing data in a manner emulating a computer as defined herein.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; a controller processor; an ASIC; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network, such as the Internet or a local area network ("LAN"); and any storage device used for storing data accessible by a computer.

A "computer system" refers to a system having a computer, where the computer comprises at least one computer and a computer-readable medium embodying software to operate the computer.

A "database" is a combination of software and hardware used to efficiently store data on an at least one information storage device, in an exemplary embodiment this includes storage on an information storage device comprising an at least one computer readable medium as defined herein.

An "information storage device" refers to an article of manufacture used to store information. An information storage device has different forms, for example, paper form and electronic form. In paper form, the information storage device includes paper printed with the information. In electronic form, the information storage device includes a computer-readable medium storing the information as software, for example, as data.

A "network" refers to a number of computers and associated devices that are connected by communication facilities. A network involves permanent connections such as cables or temporary connections such as those made through telephone or other communication links. In this way the network can be maintained by conventional wires or may also be provided wirelessly. Examples of a network include: an internet, such as the Internet; an intranet; a local area network (LAN); a wide area network (WAN); CAN and LIN networks; cellular networks; and any combination of networks, such as an internet and an intranet.

"Software" refers to prescribed rules to operate a computer or similar device. Examples of software include, but are certainly not limited to, software, code segments, program modules, instructions, computer programs, operating systems, client programs like FIREFOX, and programmed logic.

Detailed Description

The instant invention is directed to an ergonomic, hand held grip that provides ease of use for portable phone devices for extended periods of time. The invention is directed to a hand held, ergonomic grip removably retaining a portable phone device and sized and shaped to accommodate the distance from the ear to the mouth on a human head, the grip having an ergonomic grip body sized and shaped to accommodate the distance between the ear and the mouth when in an operating position. An opening removably retains the portable phone device. An at least one operating control element and an at least one portion of the ergonomic grip body facilitating release of the portable phone device from the ergonomic grip body are provided. An at least one grip element is also provided.

The ergonomic hand held grip can provide additional functionality to the portable phone device, such as but certainly not limited to recharging of the portable phone device and/or "hot syncing" and similar functions. Additionally, ergonomic hand held grip should also include optional hardware to allow the ergonomic hand held grip to act as a alternative network access point, such as a Wi-Fi network access point or "hot spots". The grip may include hardware and or software facilitating theses functions. These may include for example, but not limited to, additional information storage devices or network access peripherals.

FIG. 1 shows an exploded view of an exemplary embodiment of the instant invention. As shown in the figure, a handheld ergonomic grip 5 for a portable phone device 500 is shown. The handheld ergonomic grip 5 includes an ergonomic grip body 10 sized to fit the ergonomic parameters of the human hand and head to facilitate the use of the portable phone device in a more comfortable fashion. The ergonomic grip body 10 in the exemplary embodiment shown is generally sized to these parameters and curved to fit the general curvature of the contours of the face from the mouth to the ear when held in an operating position. In the exploded view a portable phone device 500 is shown. The portable phone device 500 is shown outside the ergonomic grip body 10 in an undocked position.

The portable phone device 500 fits in an opening 20 that accommodates the portable phone device within the ergonomic grip 10. The operator places the portable phone device 500 inside the ergonomic grip 10 in the opening 20 that accommodates the portable phone device. An at least one retaining element 100 retains the portable phone device 500. In the exemplary embodiment shown the at least one retaining element 100 is a portion of the ergonomic grip 10 and retains the portable phone device 500 through a friction fit with an at least one retaining element 100, in this instance through the friction fit is provided by a flange within the opening 20 as indicated and additionally through coupling with the interface 300 as described herein.

The ergonomic grip body 10 also features at least one gripping surface 50 to facilitate a user gripping the ergonomic grip body 10. As shown in the exemplary embodiment of FIG. 1, the gripping surface 50 is shown on side of the ergonomic grip body 10. The gripping surface 50 is repeated on the opposite side of the ergonomic grip body 10 as well. The size, shape, and location of the gripping surface can be varied without departing from the spirit of the invention. In addition, at least one portion of the ergonomic grip body 10 is formed as an at least one release portion 40 to facilitate the release of the portable phone device 500 as provided. In the exemplary embodiment shown, this at least one release portion 40 is show as a groove or channel 42 on the hand held ergonomic grip 10 and two holes 45 in the back of the hand held ergonomic grip body 10, as more clearly show in FIGS. 3-5. In this instance, the grooves or channels 42 portion primarily aids in channeling the voice of the user to the mouthpiece/microphone of the portable phone device 500, but can also assist in removing the portable phone device 500 from the hand held ergonomic grip 10. This has an added benefit in that the acoustics of the channels 42 do not require the user to talk as loudly to be heard.

In addition to features to facilitate the gripping of the hand held ergonomic grip 5, a power plug 200 can be provided to permit continuous operation of the portable phone device 500. The plug can be, for example but is certainly not limited to, any plug used to recharge the portable phone device or a USB compatible plug for instance or the like. Additionally or alternatively, additional batteries may be contained within the hand held ergonomic grip 5 to provide extended battery life without the need for a cord or attachment. In addition to providing power for operation the instant invention through the power plug 200 can charge the portable phone device 500 or additional batteries in the grip that help to power the portable phone device 500. This electrical communication and power management is further facilitated by an interface 300 in the opening 20 that accepts and couples to the portable phone device 500. The electrical coupling can also provide access to and communication with wired or wireless networks as an access point or similar node in the network. Additionally, a power management electronics package, including additional batteries, may be included as discussed herein below in relation to FIG. 3. Moreover, additional information storage devices may also be provided that access and store information while the portable phone device is in use and while the portable phone device is not in use through a network like the internet and can provide additional storage capacity to contain downloads to be uploaded to the phone or otherwise placed on the phone, thus being beneficial in the management of downloads for the personal phone device.

Figure 2:
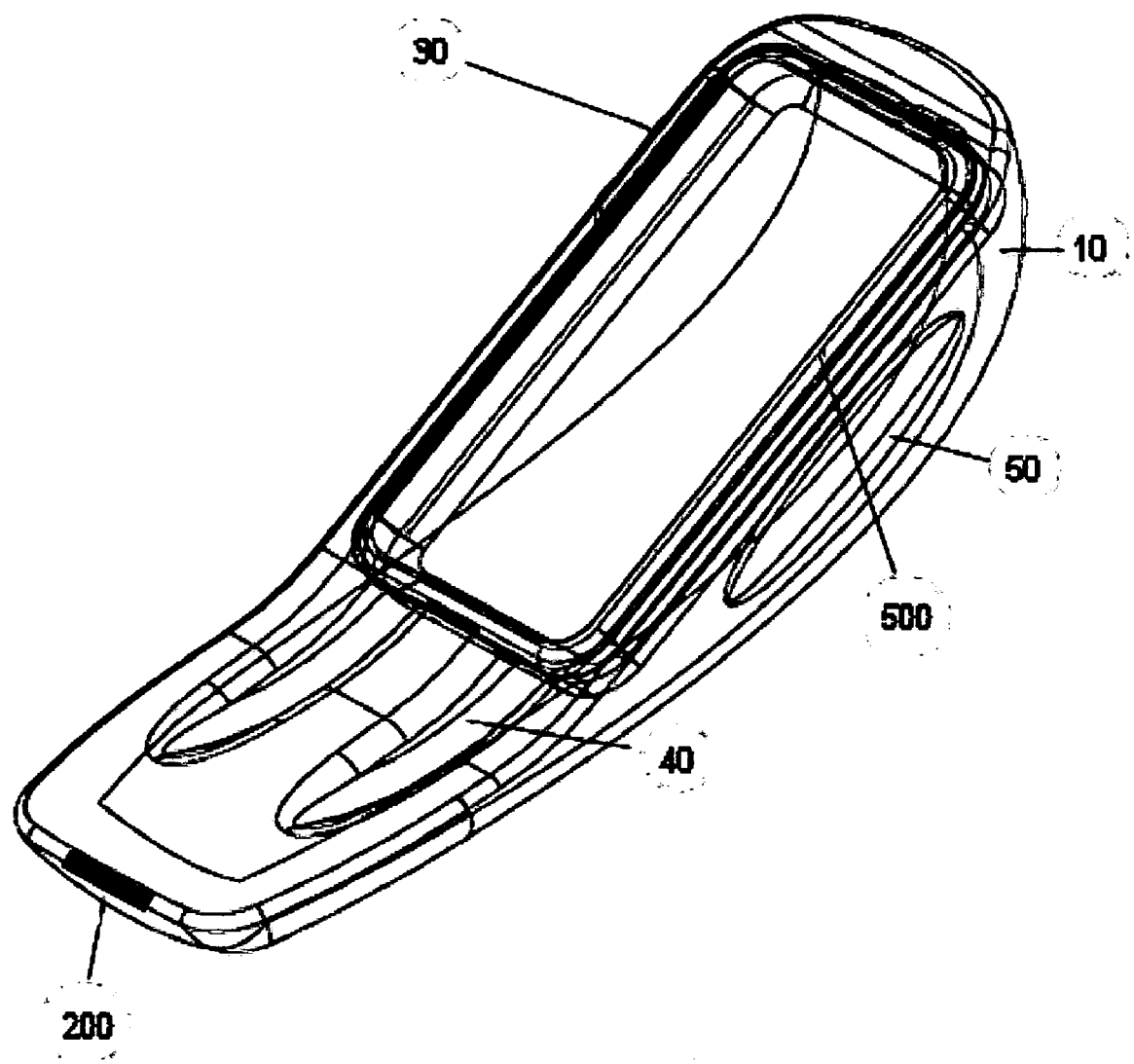
FIG. 2 illustrates an isometric view of an exemplary embodiment of the instant invention.

FIG. 2 illustrates an isometric view of an exemplary embodiment of the instant invention. The hand held ergonomic grip 10 is shown with the portable phone device 500 in an operating position. As can be seen in the exemplary embodiment shown, the portable phone device 500, an iPhone for instance, fits in the embodiment as shown. The portable phone device 500 is inserted into the recess or opening 20. The user would for instance insert the portable phone device 500, for example, when they return home. The user can operate the functions of the portable phone device 500 from the interface provided on the portable phone device 500. Additional features and access to the controls, such as the volume and power buttons, is provided by the at least one operating control element 30. In the exemplary embodiment shown the at least one control element 30 includes, for example but is certainly not limited to, push buttons or a rocker bar with buttons on one side of the ergonomic hand held grip 10 and an opening on the top of the ergonomic hand held grip 10 or the like.

Figure 3:
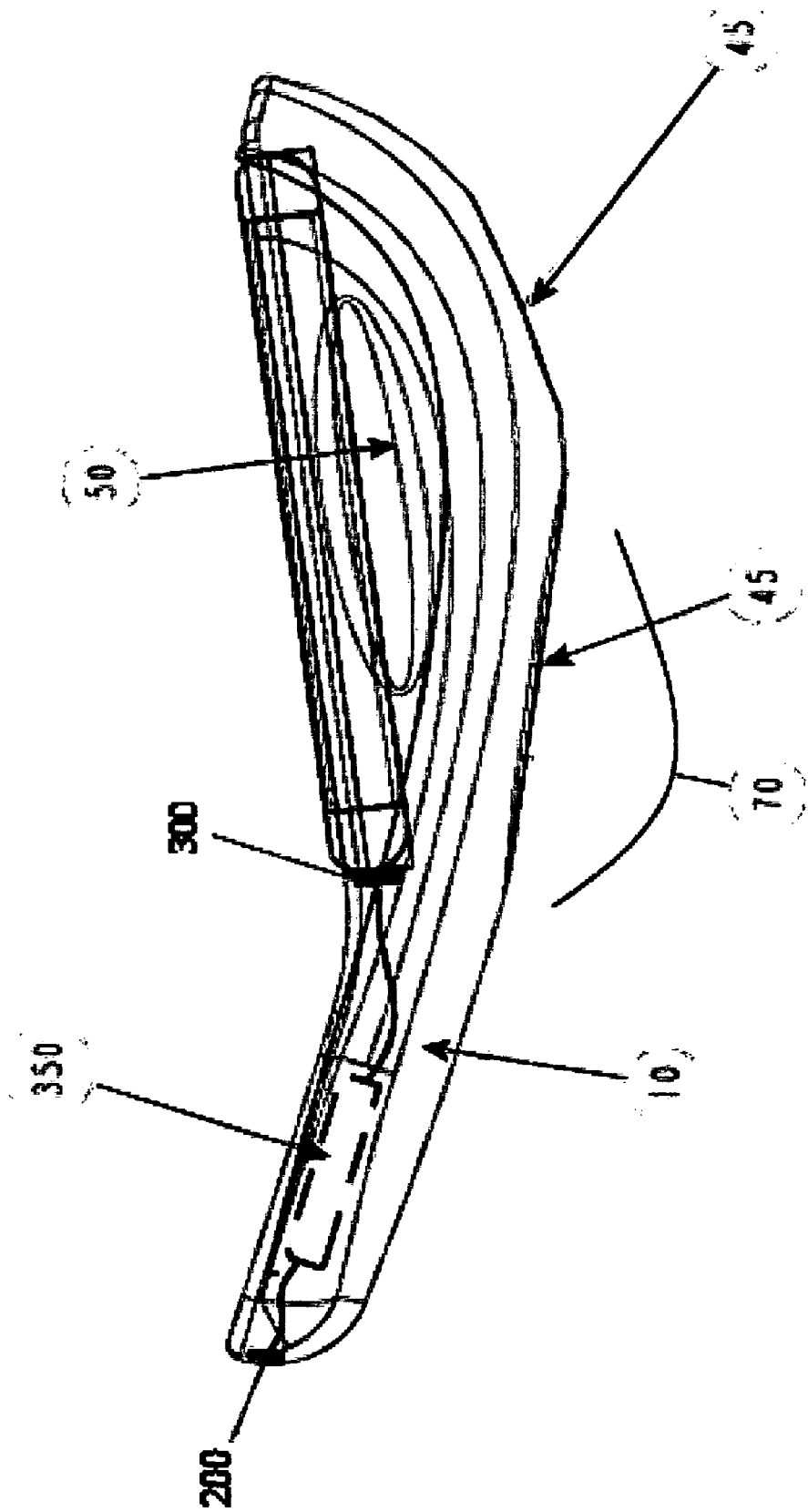
FIG. 3 illustrates a side view of an exemplary embodiment of the instant invention.

FIG. 3 illustrates a side view of an exemplary embodiment of the instant invention. The ergonomic hand held grip 10 has a generally curved shape in the exemplary embodiment shown. This further facilitates the ergonomic fit of the ergonomic hand held grip 10 to the human face and provides a more comfortable grip and position of the portable phone device 500 for use, as best see in FIG. 6. In addition to the grip, in the side view, shown in shadow, a power management electronics package 350 is provided that aids in charging the portable phone device and alternatively or additionally can provide internal batteries in the grip to furnish power to the portable phone device 500 and extend talk time. An additional information storage device may also be included. Additional body shapes may be used without departing from the spirit of the invention, so long as they are comfortable and functional for the user.

Figure 4:
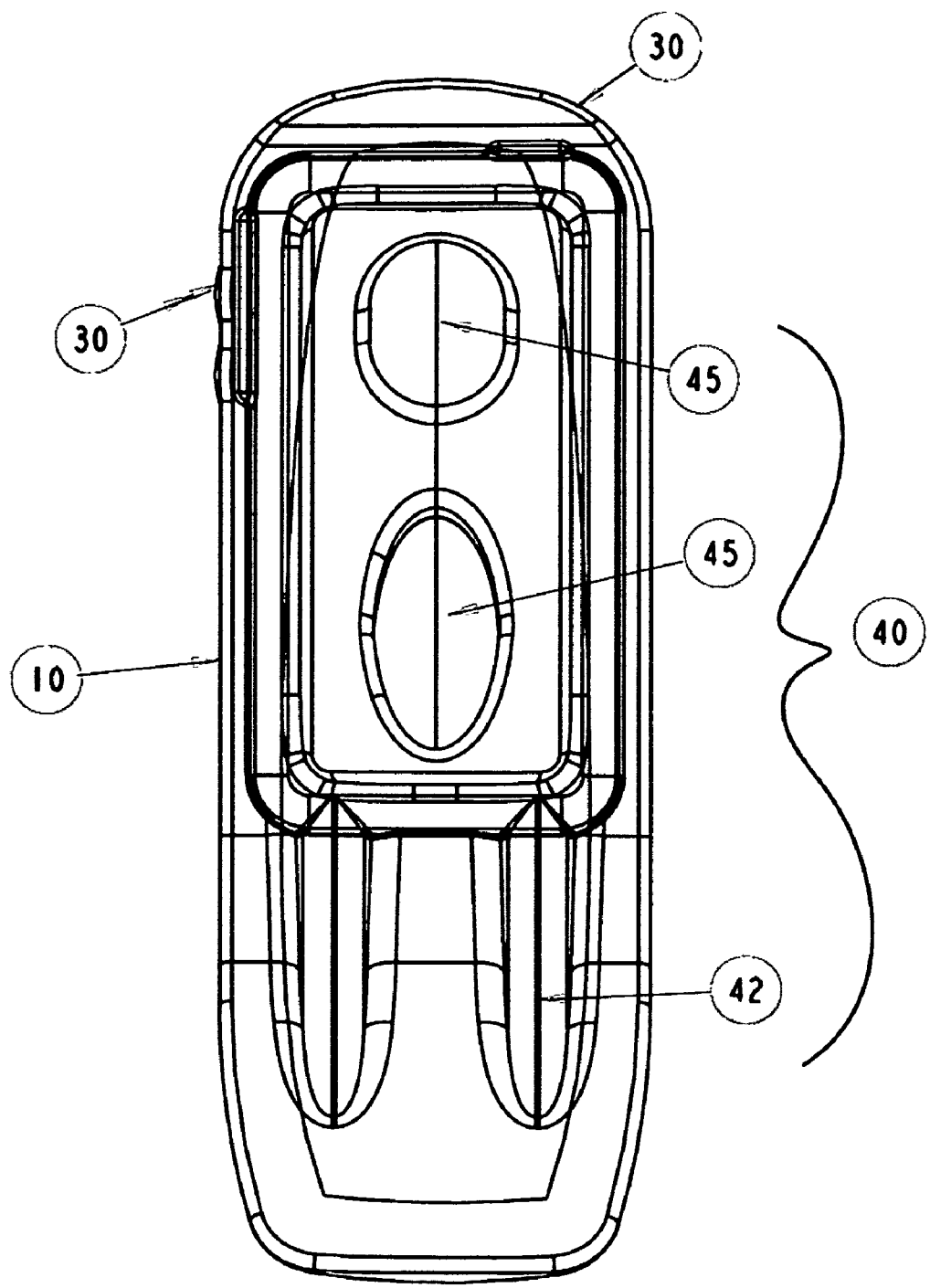
FIG. 4 illustrates a front view of an exemplary embodiment of the instant invention.

In addition to the at least one gripping surface 50, here a grip surface on the side of the ergonomic hand held grip 10 and the power management electronic package 350, along a portion of the ergonomic hand held grip 10 a flattened resting surface 70 with one of the at least one portion facilitating removal 40 of the portable phone device from the ergonomic grip contained therein, shown in the exemplary embodiment as a hole like that shown in the exemplary embodiment of FIG. 4, is shown.

FIG. 4 illustrates a front view of an exemplary embodiment of the instant invention. In the exemplary embodiment shown in the figure, the at least one portion of the ergonomic grip facilitating release of the portable phone device 40 comprises two holes 45 in the back of the ergonomic grip body 10 and two channels 42 in the lower portion 15 of the ergonomic grip body 10. These allow for quick and easy release of the portable phone device from the ergonomic grip body 10.

Figure 5:
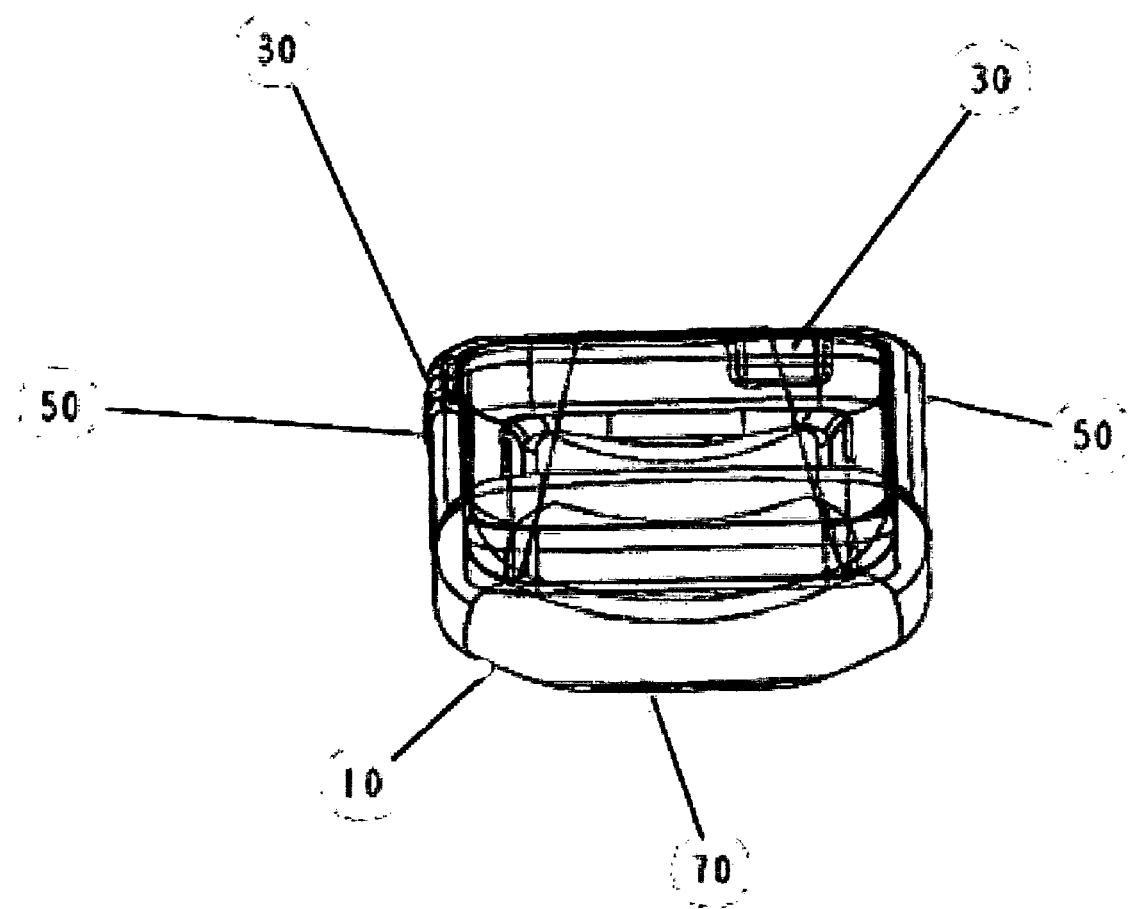
FIG. 5 illustrates an end view of an exemplary embodiment of the instant invention.

FIG. 5 illustrates an end view of an exemplary embodiment of the instant invention. As seen in the exemplary embodiment shown, the at least one operating control element 30 is shown as a cutout on the top of the ergonomic grip body 10. It also shows an at least one side gripping surface 50. Additionally, the ergonomic grip body 10 shows a flat portion 70 for resting the ergonomic grip body 10 on a surface.

Figure 6:
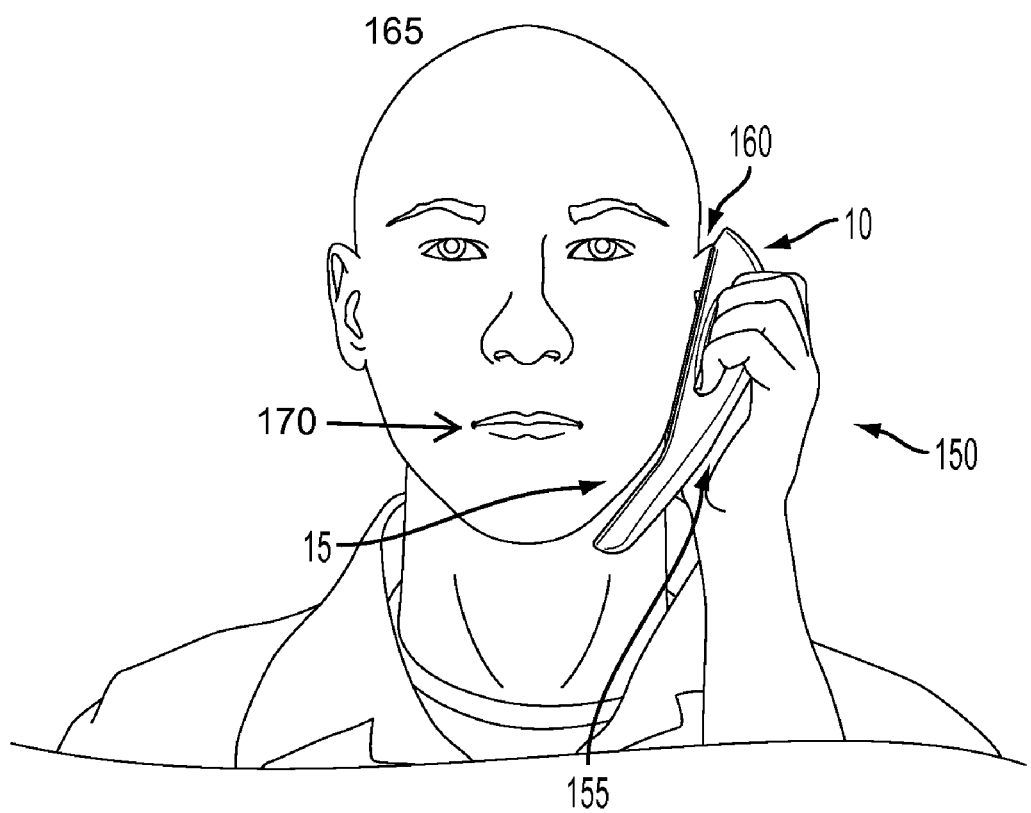
FIG. 6 illustrates an exemplary embodiment of the instant invention in an operating position.

FIG. 6 illustrates an exemplary embodiment of the instant invention in an operating position. These units or grips 5 with grip body 10 hold the portable phone device 500, as shown in FIG. 1 and described above, and fit in the hand 150 or palm of the user to be held to the ear 160 on the head 165 during operation as shown in FIG. 6. This generally orients the portable phone device 500 parallel to the ear 160 in the palm 155 of the hand 150 of the user. This allows the user to operate the portable phone device 500 while allowing for a more comfortable support and better grip by the user through the use of the instant invention. The ergonomic grip body 10 is sized and shaped to accommodate the distance between the ear 160 and the mouth 170 of the user when in the operating position. A lower portion 15 of the ergonomic grip body 10 extends to the mouth 170 and two channels 42 in this lower portion 15 provide improved acoustics, i.e. do not require the user to talk as loudly to be heard. The shape further facilitates the ergonomic fit of the ergonomic hand held grip 10 to the human head 165 and provides a more comfortable grasp and position for the portable phone device 500 while in use.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A hand held, ergonomic grip removably retaining a portable phone device and sized and shaped to accommodate the distance from the ear to the mouth on a human head, the grip comprising:
    an ergonomic grip body held in a hand and sized and shaped to accommodate the distance between said ear and said mouth when held in an operating position wherein in the operating position the ergonomic grip with the phone device is held in the palm of the hand, between the hand and the ear by the user such that when in the operating position, the palm of the user is facing the head of the user;
    an opening within the ergonomic grip body removably retaining said portable phone device therein;
    an at least one operating control element; an at least one portion of the ergonomic grip body facilitating release of the portable phone device from said ergonomic grip body; and
    an at least one grip element on said ergonomic grip, wherein a user holds the grip element, and thereby the grip body and the portable phone device, in the operating position and the ergonomic grip body fits the ergonomic distance from ear to mouth.

2. The hand held, ergonomic grip of claim 1, wherein the ergonomic grip further comprises an at least one retaining element that retains the portable phone device in the opening in the grip.

3. The hand held, ergonomic grip of claim 1, wherein the retaining element that retains the portable phone device in the opening in the grip retains it through a friction fit with said at least one retaining element.

4. The hand held, ergonomic grip of claim 1, wherein the ergonomic grip further comprises an additional power supply for said portable phone device contained within the ergonomic grip body.

5. The hand held, ergonomic grip of claim 4, wherein the additional power supply further comprises at least one additional battery that provides additional power to the portable phone device.

6. The hand held, ergonomic grip of claim 4, wherein the additional power supply further comprises an at least one power cord connector, where said power cord connector is coupled to said portable phone device and provides power from a power supply to operate, recharge, or operate and recharge the portable phone device.

7. The hand held, ergonomic grip of claim 1, wherein the ergonomic grip body has an at least one flat portion permitting the grip to rest on a flat surface when not in an operating position.

8. The hand held, ergonomic grip of claim 1, further comprising an electrical interface.

9. The hand held, ergonomic grip of claim 1, wherein the electrical interface couples via wire or wirelessly to an external computer or network access point and permits one or two way communication with the portable phone device.

10. A method of using a hand held, ergonomic grip, removably retaining a portable phone device, the method comprising the steps of:
    inserting the portable phone device into an at least one recess in the hand held, ergonomic grip such that it is removably retained;
    operating said phone within said hand held ergonomic grip; and holding said hand held grip in a hand of the user and to an ear on a head of the user such that the hand held grip is held by the palm of the hand of the user and extends substantially between said hand and said ear while extending toward the mouth of the user such that in the operating position, the palm of the user is facing the head of the user and allowing for the functioning of the portable phone device.

11. The hand held, ergonomic grip of claim 1, wherein the ergonomic grip body is curved.

12. The method of using a hand held, ergonomic grip of claim 10, wherein the step of inserting the portable phone device further comprises coupling the phone device with an electrical interface.

13. The hand held, ergonomic grip of claim 11, wherein the ergonomic grip body is curved and a lower portion of the ergonomic grip body extends beyond the hand of the user, along the general curvature of the contours of the face of the user, and toward the mouth of the user in the operating position.

14. The hand held, ergonomic grip of claim 13, wherein the lower portion further comprises at least one channel to aid in channeling the voice of the user to the microphone of the portable phone device.

* * * * *